(12) United States Patent
Archambeau et al.

(10) Patent No.: US 12,124,115 B2
(45) Date of Patent: Oct. 22, 2024

(54) OPTICAL ARTICLE

(71) Applicant: Essilor International, Charenton-le-Pont (FR)

(72) Inventors: Samuel Archambeau, Charenton-le-Pont (FR); Aude Bouchier, Charenton-le-Pont (FR); Jean-Paul Cano, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 510 days.

(21) Appl. No.: 17/622,437

(22) PCT Filed: Jun. 17, 2020

(86) PCT No.: PCT/EP2020/066838
§ 371 (c)(1),
(2) Date: Dec. 23, 2021

(87) PCT Pub. No.: WO2020/260105
PCT Pub. Date: Dec. 30, 2020

(65) Prior Publication Data
US 2022/0334410 A1    Oct. 20, 2022

(30) Foreign Application Priority Data
Jun. 28, 2019 (EP) .................... 19305881

(51) Int. Cl.
*G02C 7/08* (2006.01)
*G02B 27/00* (2006.01)
*G02F 1/29* (2006.01)

(52) U.S. Cl.
CPC ......... *G02C 7/083* (2013.01); *G02B 27/0093* (2013.01); *G02F 1/294* (2021.01)

(58) Field of Classification Search
CPC ..... G02C 7/083; G02B 27/0093; G02F 1/294; G02F 1/133362; G02F 1/135
See application file for complete search history.

(56) References Cited

U.S. PATENT DOCUMENTS 7,404,636 B2 * 7/2008 Blum ................... C07K 16/244
                                                   351/41
8,587,734 B2 * 11/2013 Li ............................ G02F 1/29
                                                  351/159.6

(Continued)

FOREIGN PATENT DOCUMENTS

| CN | 105579917 A | 5/2016 |
| CN | 105589214 A | 5/2016 |

(Continued)

OTHER PUBLICATIONS

International Search Report issued Oct. 14, 2020 in PCT/EP2020/066838 filed Jun. 17, 2020, 3 pages.

(Continued)

*Primary Examiner* — Tuyen Tra
(74) *Attorney, Agent, or Firm* — Oblon, McClelland, Maier & Neustadt, L.L.P.

(57) ABSTRACT

An optical article that includes an ophthalmic lens that includes a substrate, a first layer comprising liquid crystals being disposed on at least part of the substrate, and a first and a second electrode made of a conductive material, and a voltage source electrically connected to the first and second electrodes and configured to control an orientation of the liquid crystals depending on the voltage applied. The ophthalmic lens further includes a second layer made of photoconductive material placed between the electrodes, and the optical article further includes a light projector configured to project a light pattern on the second layer of the ophthalmic lens, the second layer being locally conductive when illuminated by the light pattern, the light pattern corresponding (Continued)

to a pattern of refractive index modification to be induced by the liquid crystals of the first layer.

9 Claims, 2 Drawing Sheets

(56) References Cited

U.S. PATENT DOCUMENTS

| | | | |
|---|---|---|---|
| 10,001,661 | B1 | 6/2018 | Weibel et al. |
| 10,859,868 | B2* | 12/2020 | Lin .................. G02F 1/133526 |
| 11,221,508 | B2* | 1/2022 | Li ..................... G02F 1/133504 |
| 2006/0043184 | A1 | 3/2006 | Fukuchi et al. |
| 2007/0052876 | A1 | 3/2007 | Kaufman et al. |
| 2008/0024858 | A1 | 1/2008 | Kaufman et al. |
| 2014/0084489 | A1 | 3/2014 | Etzkorn |
| 2019/0324294 | A1 | 10/2019 | Kamibeppu et al. |
| 2022/0252904 | A1* | 8/2022 | Hones, Jr. .............. G02C 7/083 |

FOREIGN PATENT DOCUMENTS

| | | |
|---|---|---|
| EP | 1 673 656 A2 | 6/2006 |
| JP | 55-95106 U | 7/1980 |
| JP | 7-270746 A | 10/1995 |
| JP | 8-62564 A | 3/1996 |
| JP | 2005-292662 A | 10/2005 |
| JP | 2006-72280 A | 3/2006 |
| JP | 2010-517116 A | 5/2010 |
| JP | 2016-536700 A | 11/2016 |
| JP | 2018-138999 A | 9/2018 |
| WO | WO 2005/033782 A2 | 4/2005 |
| WO | WO 2008/098205 A1 | 8/2008 |
| WO | WO 2018/123195 A1 | 7/2018 |

OTHER PUBLICATIONS

Extended European Search Report issued Jan. 7, 2020 in European Patent Application No. 19305881.5 filed Jun. 28, 2019, 5 pages.
Guralnik, I., et al., "High-sensitivity optically addressed liquid-crystal lens", Proceedings of SPIE, col. 5137, XP055653225, 2002, pp. 194-200, 8 total pages.

* cited by examiner

OPTICAL ARTICLE

FIELD OF THE INVENTION

The invention concerns active lenses, in which the refractive index of the lens may be locally varied using liquid crystal cells.

BACKGROUND OF THE INVENTION

Active lenses may be used to provide a specific optical function on demand, for example by changing locally the optical power of the lens. Active lenses may be used by the eye-care professional to propose different lens designs based on the prescription of the wearer. Active lenses, such as the Touchfocus™ eyeglasses of the company Mitsui Chemicals for example, may also be used to provide an additional power in the near field of view to transform temporarily a single vision ophthalmic lens in a bifocal lens.

Active lenses may comprise a Fresnel lens with concentric ridges filled with liquid crystals. The active lens is activated on demand by applying a command voltage to the liquid crystals. This type of active lens has the drawback that the geometry of the Fresnel lens is fixed. Thus, the optical function provided may not be varied. Further, the structure of the Fresnel lens is visible when the liquid crystals are deactivated which results in a lack of comfort for the wearer of the active lens.

Other active lenses may comprise matrices of liquid crystal cells distributed on the surface of the lens. The liquid crystal cells are separated either by command transistors in the case of an active matrix or by command electrodes connected to the electrodes of the liquid crystal cells in the case of a passive matrix. Such active lenses enable a greater adaptability regarding the choice of the optical function to provide. However, such active lenses have several drawbacks. The presence of transistors or command electrodes induces some diffraction which deteriorates the optical function. Also, the size of the pixels is limited by the presence of the transistors or command electrodes which are adjacent to the liquid crystal cells. Further, in the case of active matrices, the transmission of the active lens is limited by the presence of the non-transparent transistors adjacent to the liquid crystal cells. Furthermore, matrices of liquid crystal cells are not adapted to be integrated on in lenses having low radius of curvature. The matrices of liquid crystal cells are thus manufactured on planar substrates and are embedded within the ophthalmic lens which makes them visible to the wearer and complicates the integration.

SUMMARY OF THE INVENTION

In view of the above, one aim of the invention is to alleviate at least part of the inconveniences of the prior art.

In particular, one aim of the invention is to propose an active lens with a better transparency than the active lenses comprising matrices of liquid crystals previously described.

Another aim of the invention is to propose an active lens with which it is possible to provide optical functions which are not subject to diffraction caused by the matrix of transistors or command electrodes adjacent to the liquid crystal cells.

Another aim of the invention is to propose an active lens which is easier to manufacture.

To this end, it is proposed, according to a first aspect, an optical article comprising:

at least an ophthalmic lens comprising:

a substrate, a first layer comprising liquid crystals, said layer being disposed on at least part of the substrate, a first and a second electrode made of a conductive material and disposed on opposite sides of the first layer, a voltage source electrically connected to the first and second electrodes, the voltage source being configured to control an orientation of the liquid crystals depending on the voltage applied between the first and second electrodes, wherein:

the ophthalmic lens further comprises a second layer made of photoconductive material placed between the first and second electrodes, and the optical article further comprises a light projector configured to project a light pattern on the second layer of the ophthalmic lens, said second layer being locally conductive when illuminated by the light pattern, said light pattern corresponding to a pattern of refractive index modification to be induced by the liquid crystals of the first layer.

In embodiments, the optical article may further comprise one or a combination of the following features:

the liquid crystals are blue phase liquid crystals or short pitch cholesteric liquid crystals. The refractive index pattern induced by the liquid crystals is thus isotropic and all directions of polarization may enter the liquid crystal layer. The ophthalmic lens is thus easier to manufacture as there is no need for a polarizing layer, the light projector comprises at least one light source and at least a pattern generator configured to provide, when illuminated by the light source, the light pattern to be projected on the second layer. The pattern generator may be one of:

a spatial light modulator, wherein a spatial light modulator (SLM) comprises a matrix of liquid crystal cells. Each liquid crystal cell is controlled independently to modify the amplitude and/or the phase of light incoming on each liquid crystal cell. The SLM is thus illuminated by a light source. The SLM may be transmissive or reflective, in which case the SLM comprises a reflective layer.

a hologram, configured to provide the light pattern to be projected on the second layer when illuminated by the light source, for example a Computer Generated Hologram or a Fourier Hologram, the light projector comprises:

at least one light source, a plurality of holograms, each hologram being configured to provide, when illuminated, one of a plurality of light patterns to be projected on the second layer and a selecting device illuminated by the light source and configured to select which one of the plurality of holograms is illuminated by the light source. Depending on the selected hologram, a different light pattern may be projected on the photoconductive layer and thus a different refractive index pattern may be induced by the liquid crystal layer. In addition or alternatively, depending on the selected hologram, the light pattern may be projected on a different position of the ophthalmic lens, the selecting device may be configured to deflect at least one light source on one of the plurality of holograms. In that case, the selecting device may be one of a micro-mirror array, a single micro-mirror, a reflective spatial light modulator and an actively controlled optical transmission element for example. The actively controlled optical transmission element may for example be one of:

an active prism whose deflection angle may be actively controlled by varying the refractive index of the prism when it is filled with liquid crystals or by modifying the orientation of a surface of the prism when the prism comprises two plates connected by a bellow structure filled with a fluid for example, and a glass window whose tilt angle may be controlled.

the selecting device may be a transmissive spatial light modulator configured to illuminate one of the plurality of holograms when illuminated by at least one light source, the optical article comprises a light deflector configured to deflect the light pattern produced by the light projector on a plurality of locations on the surface of the second layer of the ophthalmic lens. Such a light deflector may be for example used when a portion of the ophthalmic lens should be illuminated by the light pattern produced by the light generator. The position of the light pattern on the ophthalmic lens may thus take into account preferred gaze directions of the wearer of the eyeglasses for example. Such a light deflector may also be controlled in order to follow the gaze direction of the wearer, the light deflector may be one of a micro-mirror array, a single mirror array, an actively controlled optical transmission element as described earlier, the optical article is a pair of eyeglasses comprising a frame and two ophthalmic lenses, wherein:

the voltage source is disposed on the frame and is electrically connected to the first and second electrodes of each of the ophthalmic lenses, the voltage source being configured to control an orientation of the liquid crystals depending on the voltage applied between the first and second electrodes of each of the ophthalmic lenses, and the pair of eyeglasses further comprises two light projectors disposed on the frame, each of the light projectors being configured to project a light pattern on the second layer of one of the ophthalmic lenses, said second layer being locally conductive when illuminated by the light pattern, said light pattern corresponding to a pattern of refractive index modification to be induced by the liquid crystals of the first layer of the considered ophthalmic lens.

the pair of eyeglasses further comprises:

an eye-tracking device placed on the frame and configured to determine a viewing angle of a wearer of the eyeglasses, and the pair of eyeglasses further comprises two light deflectors, each light deflector being configured to deflect the light pattern produced by one of said light projectors on the surface of the second layer of one of the ophthalmic lenses at a location corresponding to the intersection of the determined viewing angle with the second layer of the considered ophthalmic lens.

It is also proposed, according to a second aspect, a method for locally modifying the refractive index of an ophthalmic lens to provide an additional optical function to the ophthalmic lens, the method comprising the steps of:

providing an optical article comprising:
an ophthalmic lens comprising:
a substrate,
a first layer comprising liquid crystals, said layer being disposed on at least part of the substrate,
a first and a second electrode made of a conductive material and disposed on both sides of the first layer,
a second layer made of photoconductive material placed between the first and second electrodes, and
a voltage source electrically connected to the first and second electrodes, the voltage source being configured to control an orientation of the liquid crystals depending on the voltage applied between the first and second electrodes,
a light projector configured to project a light pattern on the second layer of the ophthalmic lens, said second layer being locally conductive when illuminated by the light pattern, said light pattern corresponding to a pattern of refractive index modification to be induced by the liquid crystals of the first layer,
applying a voltage between the first and the second electrodes using said voltage source,
illuminating the ophthalmic lens with the light pattern provided by the light projector.

The additional optical function may provide for a correction of the ametropia of the wearer which may be added to the ophthalmic lens. The correction may be one or more of a sphere, an astigmatism, a prism, an addition. The totality or part of the correction may be provided by the optical function. For example, when the ophthalmic lens is a single vision lens, the addition in the near vision zone may be provided by the pattern of refractive index modification resulting from the illumination of the ophthalmic lens by the light pattern.

According to the invention, it is possible to provide an active lens which is directly driven by the light pattern received on the active lens. The size of the pixels of the refractive index pattern is thus not limited by the matrix of transistors or command electrodes adjacent to the liquid crystal cells. The size of the pixels of the refractive index pattern is rather limited by the resolution of the light pattern projected on the layer of photoconductive material and eventually by the diffusion of charges in the photoconductive material, depending on the photoconductive material used. The quality of the optical function resulting from the refractive index modification is improved as no diffraction pattern is induced by the presence of command electrodes or command transistors on the surface of the ophthalmic lens. Also, the active lens has a transmission comparable, if not identical, to the transmission of standard ophthalmic lenses as no command transistors are placed on the optical surface of the ophthalmic lens. In fact, the wearer using the optical active lens of the invention does not notice any substantial difference when viewing through an optical active lens in comparison with standard ophthalmic lenses.

Further, the invention may be implemented on any type of ophthalmic lens and is not limited by the curvature of the ophthalmic lens considered.

Further, such active lenses are easy to manufacture. According to the invention, the layer comprising liquid crystals is placed between two layers of at least partly transparent conductive material and between one of the conductive material layers and a layer of photoconductive material which is activated by the projected light pattern. The layers of conductive material are directly connected to a voltage source and the light pattern is produced by a light projector placed within a frame of the corresponding eyeglasses.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE INVENTION

Figure 1A:
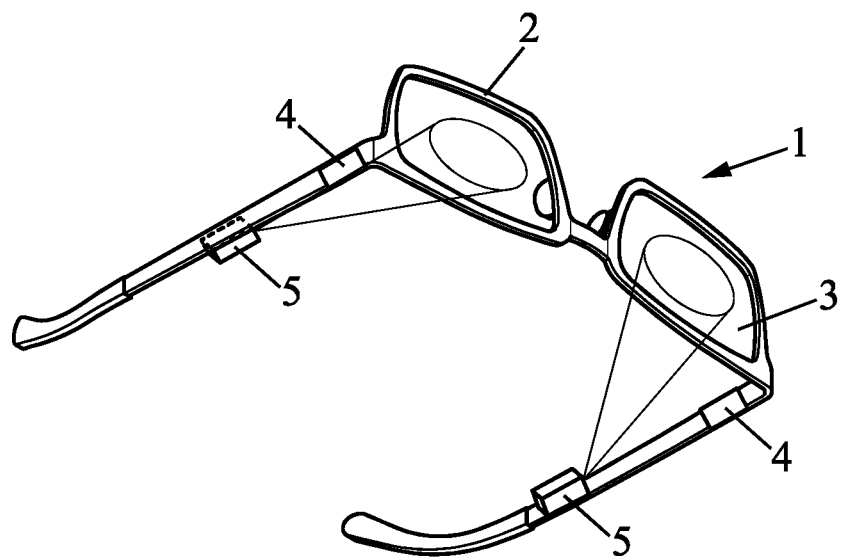
FIG. 1A illustrates an optical article according to an embodiment and FIG. 1B illustrates in more detail one ophthalmic lens of the optical article according to an embodiment.

In the description which follows the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

FIG. 1A illustrates an optical article 1, here a pair of eyeglasses, according to an embodiment. The pair of eyeglasses 1 comprises a frame 2, two ophthalmic lenses 3, two voltage sources 4 and two light projectors 5. Each light projector 5 is configured to project a light pattern on the totality or a part of one of the ophthalmic lenses 3 and each voltage source 4 is electrically connected to one ophthalmic lens 3.

Figure 1B:
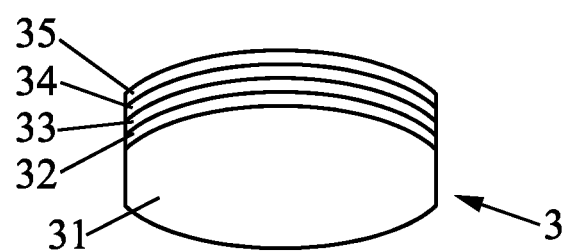

According to an embodiment illustrated in FIG. 1B, each ophthalmic lens 3 comprises a substrate 31 on which a first electrode 32, a first layer 33 comprising liquid crystals, a second layer 34 made of photoconductive material and a second electrode 35 are stacked. The first and the second electrodes 32, 35 are disposed on opposite sides of the first layer 33 comprising liquid crystals. The second layer 34 made of photoconductive material is placed between one of the electrodes 32, 35 and the first layer 33 comprising liquid crystals.

The substrate 31 is made of glass or plastic and has two surfaces defining the shape of the ophthalmic lens 3. The ophthalmic lens 3 may or may not be configured to correct an ametropia of the wearer. The first and second electrodes 32 are made of a substantially transparent conductive material, preferably a conductive oxide, such as Indium Tin Oxide (ITO), Zinc Oxide (ZnO) or Aluminium-doped Zinc Oxide (AZO) for example, which is at least partly transparent over the visible range. The first and second electrodes are electrically connected to the voltage source 4 which is configured to control an orientation of the liquid crystals within the first layer 33.

The first layer 33 may comprise twisted nematic liquid crystals, cholesteric liquid crystals or blue phase liquid crystals. Within the first layer 33, the liquid crystals are encased by two alignment layers formed of rubbed polyimide (AM4276) layers for example.

When the first layer 33 comprises twisted nematic liquid crystals, the ophthalmic lens 3 further comprises a polarizer placed on the side of the ophthalmic lens opposite to the eye of the wearer. The polarizer enables to select the polarization of light coming from the environment of the wearer passing through the first layer 33. When the polarizer has the same orientation as the alignment layer, the light passes through to enter the first layer 33. The refractive index seen by the light passing through the layer 33 comprising twisted nematic liquid crystals depends on whether the nematic liquid crystals are in a twisted nematic configuration or a configuration in which the liquid crystals are oriented in the direction of the corresponding electrical field applied.

When the first layer 33 comprises short pitch cholesteric liquid crystals, i.e. a nematic liquid crystal mixture and a chiral dopant such as for example CB15, ZLI-811 or ZLI-4571, the liquid crystals form helices between both alignment layers. The pitch of the helices is of the order or smaller than the wavelength of light. Thus, light passing through the layer 33 comprising liquid crystals in a cholesteric configuration, i.e. forming helices, sees a medium of defined effective refractive index for all polarization directions of the incoming light. When a high voltage, usually comprised between 20V and 50V depending on the type of liquid crystals considered, is applied on the electrodes on both sides of the liquid crystal layer, the liquid crystals are in an homeotropic configuration, i.e. the liquid crystals are oriented in the direction of the electrical field applied and the light passing through the liquid crystal layer sees another value of refractive index.

When the first layer 33 comprises blue phase liquid crystals, i.e. a nematic liquid crystal mixture and a chiral dopant in a higher concentration as the one used for short pitch cholesteric liquid crystals such as for example JC1041-XX, 5CB, ZLI4572 associated to RM257, EHA for polymer stabilization as disclosed in US 2008/0259254 A1 for example, the liquid crystals form a cubic system of helices between the alignment layers. The refractive index seen by the light passing through the liquid crystal layer may be directly triggered by the amplitude of the voltage applied on both sides of the liquid crystal layer.

Using short pitch cholesteric crystals or blue phase liquid crystals, all the directions of polarization of the light incoming on the same part of the liquid crystal layer are subjected to the same refractive index.

The second layer 34 is made of photoconductive material that is at least partly transparent in the visible range and that absorbs excitation light such as ultraviolet light or infrared light for example. The photoconductive material is for example a ZnO nanoparticle suspension in ethanol spin-coated on a first electrode 32 made of ITO and annealed at 180° C. for 10 min, or ZnO nanoparticles deposited by Chemical Vapor Deposition or by sputtering. Other photoconductive material that may be used comprises Zinc Oxide (ZnO), Titanium Oxide ($TiO_2$), amorphous silicon wherein the depth of the layer is chosen so that the amorphous silicon layer is partly transparent, a Gallium arsenide alloy, Bismuth oxide, organic photoconductive materials such as Phthalocyanine, Polyvinylcarbazole, Polythiophene for example.

A photoconductive material is a material that, in absence of excitation light, is an electrical insulator and that, when illuminated by excitation light, becomes electrically conductive. Thus, depending on the light pattern of excitation light that is projected on the ophthalmic lens 3 by the corresponding light projector 5, a voltage is locally applied to the liquid crystals comprised in the first layer 33. Depending on the value of the voltage applied, the liquid crystals may change their orientation and thus the refractive index seen by the light passing through the liquid crystal layer may be locally modified, depending on the light pattern of excitation light applied.

The light pattern may be a binary pattern or a pattern having different light intensities, i.e. grey level, depending on the type of liquid crystal used. A binary light pattern may be used in conjunction with twisted nematics or short pitch cholesteric crystals whereas a pattern having different grey levels may be used in conjunction with blue phase liquid crystals and twisted nematics, for example.

Depending on the light pattern of excitation light projected on the photoconductive material, different optical functions may be provided by the liquid crystal layer. These optical functions comprise lenses providing a given optical power, cylinder and/or prism for example.

The optical functions are provided by the refractive index pattern induced by the light pattern of excitation light.

Figure 2A:
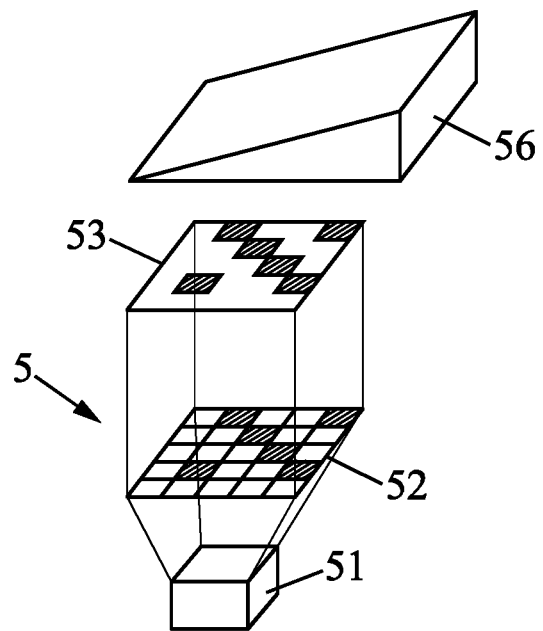
FIGS. 2A, 2B illustrate different embodiments of the light projector.

According to an embodiment illustrated in FIG. 2A, the light projector 5 comprises a coherent light source 51, comprising for example a laser diode, a laser emitting ultraviolet or infrared light, a VECSEL, a VCSEL or a LED (Light Emitting Diode) with an external cavity, and a spatial light modulator (SLM) 52 made of an array of liquid crystal cells functioning in transmission. The light source 51 is configured to illuminate the surface of the spatial light modulator. The light source may comprise beam forming optics, such as a pair of lenses for example if needed, to adapt the size and the convergence of the light beam emitted by the light source and arriving on the spatial light modulator. The spatial light modulator 52 is configured to produce a light pattern 53 intended to be projected on the ophthalmic lens 3, and more particularly on the second layer 34. The light pattern 53 may correspond to a pattern of light intensity which is defined by the SLM. The light projector may also comprise some beam forming optics to adapt the size and quality of the light pattern projected on the ophthalmic lens.

Optionally, the optical article 1 may further comprise, according to an embodiment, a light deflector 56 configured to control the position of the light pattern on the ophthalmic lens. The light deflector may be comprised within the light projector 5 as illustrated on FIG. 2A and may be a prism or an inclined transparent plate for example. The angle of deviation may be fixed or actively controlled as described later in reference to the embodiment of FIG. 2B.

According to another embodiment, the light pattern 53 may also comprise variations of the phase. Those variations of the phase may be used to induce a deflection of the light beam coming out of the SLM. The position of the light pattern 53 on the ophthalmic lens is thus controlled by the phase induced by the SLM and a light deflector may in that case not be used.

According to another embodiment not represented here, the spatial light modulator 52 is functioning in reflection.

The use of a spatial light modulator presents several advantages. The light pattern generated by the SLM may be easily reconfigured and adapted to the situation. For example, the size and/or the position of the light pattern on the ophthalmic lens may be varied. Also, the optical function induced on the ophthalmic lens may also be easily varied. To limit the computation power, a set of predetermined optical functions or patterns to be encoded in the SLM may be stored in a memory. According to an embodiment, the spatial light modulator 52 may be replaced by a hologram. In that case, the light pattern produced is fixed.

According to an embodiment, the hologram is configured so that, when illuminated with the light beam provided by the light source, a light pattern spatially corresponding substantially to the refractive index pattern providing for the wished optical function is produced. The value of the refractive index is then set by the voltage applied on the liquid crystals. The hologram may be configured to provide the wished light pattern at a specific location of the ophthalmic lens.

According to an embodiment, an additional deflector may be superposed on the hologram to adjust the location of the light pattern produced by the hologram on the ophthalmic lens. Such an additional reflector may be a holographic grating or a corrugated film bonded to the substrate of the hologram.

The holograms may be Computer Generated Holograms calculated based on the Fourier Transform using the Lohman method for example or other methods known of the person skilled in the art such as the kinoform hologram method or an Iterative Fourier Transform Algorithm (IFTA, also called Gerchberg-Saxton algorithm) or point source holograms for example, and may be printed thanks to classical printing on transparent film, photolithography, nanoimprint, embossing on polymer material for example. The replication may be obtained by molding methods for example.

Holograms may also be recorded in photosensitive materials (photopolymers, dichromated gelatin, for example) thanks to a holographic recording setup. This setup can use real objects or a SLM displaying a computed pattern as object placed at the focal plane of a lens to provide the object beam to record the Fourier transform of the objet by interference with the reference beam. Such holograms are called Fourier Holograms. The materials could be active materials (H-PDLC for holographic polymer dispersed liquid crystal for example). These holograms can then be replicated thanks to methods based on optical replication in photosensitive material.

Figure 2B:
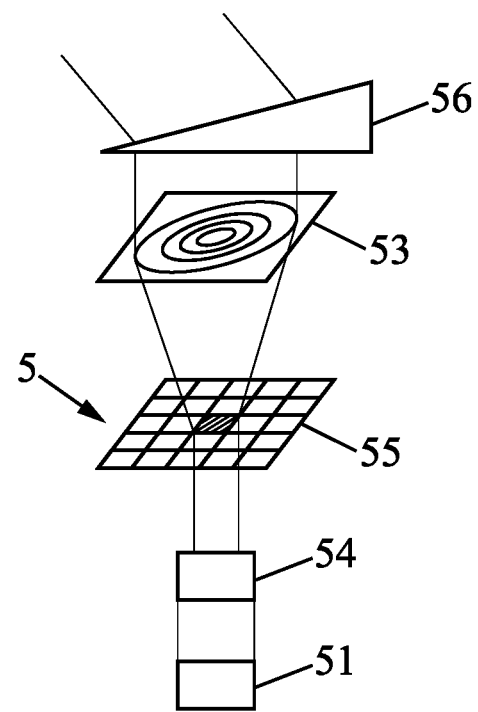

According to an embodiment illustrated in FIG. 2B, the light projector 5 comprises at least one coherent light source 51, a selecting device 54 and an array of holograms 55. At least some of the holograms may be configured to produce, when illuminated, a different light pattern that may correspond to a different position of the light pattern on the ophthalmic lens 3 or to a different optical function. The optical function may be of a different type such as an additional lens with prism, cylinder, sphere and/or addition for example and/or or have different characteristics such as a different optical power, average sphere, cylinder or addition for example.

The at least one light source 51 is configured to illuminate the selecting device 54 and the selecting device 54 is configured to illuminate at least one of the holograms of the array of holograms 55. The light pattern 53 produced by the hologram selected is then projected on the totality or a part of the ophthalmic lens 3. As illustrated in this embodiment, the light pattern may correspond to a succession of concentric rings. The corresponding pattern of refractive index formed by the first layer 33 forming a Fresnel lens. As discussed earlier, other refractive index patterns may be induced to provide for other optical functions.

According to one embodiment, when the light projector comprises at least one light source, the selecting device 54 may be one of:
  a micro-mirror array configured to deflect the at least one light source on at least one of the plurality of holograms, the micro-mirror array being for example a DMD (Digital Micro-mirror Device) in which the deflection angle may be selected among a discrete number of values, a reflective or transmissive spatial light modulator (SLM) configured to illuminate at least one of the plurality of holograms.

The light projector may comprise a single light source 51 configured to illuminate one of the selecting device mentioned above or a matrix of light sources each configured to illuminate one of liquid crystal cells forming the spatial light modulator or one of the micro-mirror arrays for example.

According to one embodiment, when the light projector comprises one light source 51 configured to illuminate the selecting device 54, the selecting device 54 may be one of:
  a single micro-mirror in which the deflection angle may be continuously varied, in which case, the single micro-mirror is illuminated by one light source,
  an actively controlled optical transmission element such as an active prism in which the direction of deflection may be actively controlled so that one of the plurality of holograms is illuminated or a glass window whose tilt angle may be actively controlled. An active prism may for ex ample be a prism whose deflection angle may be actively controlled by varying the refractive index of the prism when it is filled with liquid crystals or by modifying the orientation of a surface of the prism when the prism comprises two plates connected by a bellow structure filled with a fluid.

In the present description, the expression "actively controlled optical transmission element" means an at least partially transparent element which when crossed by a light beam is configured to deflect said light beam according to an angle which may be set by applying a corresponding command voltage.

According to an alternate embodiment, the light projector may comprise a plurality of light sources each configured to illuminate one of the holograms of the array of holograms and a control unit configured to select which light source of the plurality of light sources is switched on.

According to an embodiment, the optical article 1 may further comprise a light deflector on the frame of the pair of eyeglasses. The light deflector 56 is configured to control the position of the at least one light pattern to be projected on the ophthalmic lens. According to an embodiment, the light projector 5 comprises the light deflector 56.

According to an embodiment, the light deflector may be configured to deflect a light pattern produced by the light generator on a plurality of locations on the surface of the ophthalmic lens 3 and thus on the second layer 34. Such a light deflector may be used when a part of the ophthalmic lens is illuminated by the light pattern produced by the light generator. Such a light deflector may be controlled in order to follow the viewing direction of a wearer of the eyeglasses.

According to another embodiment, the measured viewing direction of the wearer may be used to select the light pattern intended to be projected on the layer of photoconductive material 34 and/or the position of the light pattern on the ophthalmic lens using one of the other means previously described configured to control the position of the projected light pattern on the ophthalmic lens. For example, a different optical function may be induced depending on whether the viewing direction of the wearer corresponds to near vision or distance vision. In that case, the optical article further comprises an eye-tracking device configured to detect the viewing direction of a wearer for each eye of the wearer. Each light deflector is then configured to deflect the light pattern produced by one of said light projectors on the surface of the second layer of one of the ophthalmic lenses at a location corresponding to the intersection of the determined viewing direction with the second layer of the considered ophthalmic lens 3.

The eye-tracking device may comprise an additional light source configured to illuminate an eye of the wearer and a camera configured to image the eye of the wearer illuminated by the additional light source. The ophthalmic lens 3 may then further comprise a light reflector, such as a holographic mirror, configured to reflect the light emitted by the additional light source in the direction of an eye of the wearer and to reflect the light reflected by the eye of the wearer in the direction of the camera. The eye-tracking device is configured to follow the pupil or the iris of the eye of the wearer. Eye-tracking devices are known from the person skilled in the art and will not be further described here.

Figure 3:
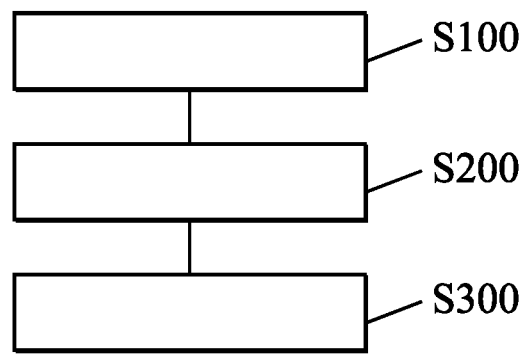
FIG. 3 illustrates a method for locally modifying the refractive index of an ophthalmic lens to provide an additional optical function to an ophthalmic lens.

FIG. 3 illustrates a method for locally modifying the refractive index of an ophthalmic lens to provide an additional optical function to an ophthalmic lens.

The method comprises a step S100 of providing an optical article such as the one described with reference to FIG. 1 for example comprising:
  an ophthalmic lens 3 comprising:
    a substrate 31,
    a first layer 33 comprising liquid crystals, said layer being disposed on at least part of the substrate,
    a first and a second electrode 32, 35 made of a conductive material and disposed on both sides of the first layer,
    a second layer 34 made of photoconductive material placed between the first and second electrodes, and
  a voltage source 4 electrically connected to the first and second electrodes 32, 35, the voltage source 4 being configured to control an orientation of the liquid crystals depending on the voltage applied between the first and second electrodes,
  a light projector 5 configured to project a light pattern on the second layer 34 of the ophthalmic lens, said second layer being locally conductive when illuminated by the light pattern, said light pattern corresponding to a pattern of refractive index modification to be induced by the liquid crystals of the first layer.

The method further comprises a step S200 of applying a voltage between the first and the second electrodes using said voltage source. As described earlier, the voltage applied enables to control an orientation of the liquid crystals.

The method further comprises a step S300 of illuminating the ophthalmic lens with the light pattern provided by the light projector as described above.

According to an embodiment, the step S300 of illuminating the ophthalmic lens may trigger the step S200 of applying a voltage between the first and the second electrodes of the ophthalmic lens and vice versa.

Although representative processes and articles have been described in detail herein, those skilled in the art will recognize that various substitutions and modifications may be made without departing from the scope of what is described and defined by the appended claims.

The invention claimed is:

1. An optical article comprising:
  at least an ophthalmic lens comprising:
    a substrate,
    a first layer comprising liquid crystals, said first layer being disposed on at least part of the substrate,
    a first electrode and a second electrode made of a conductive material and disposed on opposite sides of the first layer; and a voltage source electrically connected to the first and second electrodes, the voltage source being configured to control an orientation of the liquid crystals depending on the voltage applied between the first and second electrodes, wherein:

the ophthalmic lens further comprises a second layer made of photoconductive material placed between the first and second electrodes, and the optical article further comprises a light projector configured to project a light pattern on the second layer of the ophthalmic lens, said second layer being locally conductive when illuminated by the light pattern, said light pattern corresponding to a pattern of refractive index modification to be induced by the liquid crystals of the first layer.

2. The optical article according to claim 1, wherein the liquid crystals are blue phase liquid crystals or short pitch cholesteric liquid crystals.

3. The optical article according to claim 1, wherein the light projector comprises at least one light source and at least a pattern generator configured to provide, when illuminated by the light source, the light pattern to be projected on the second layer.

4. The optical article according to claim 3, wherein the light projector comprises:

at least one light source, a plurality of holograms, each hologram being configured to provide, when illuminated by the light source, one of a plurality of light patterns to be projected on the second layer, and a selecting device illuminated by the light source and configured to select which one of the plurality of holograms is illuminated by the light source.

5. The optical article according to claim 4, wherein the selecting device is one of a micro-mirror array, a single micro-mirror, an actively controlled optical transmission element, a reflective spatial light modulator configured to deflect the light source on one of the plurality of holograms or a transmissive spatial light modulator configured to illuminate one of the plurality of holograms when illuminated by the light source.

6. The optical article according to claim 1, wherein the optical article comprises a light deflector configured to deflect the light pattern produced by the light projector on a plurality of locations on the surface of the second layer of the ophthalmic lens.

7. The optical article according to claim 1, wherein the optical article is a pair of eyeglasses comprising a frame two ophthalmic lenses, wherein:

the voltage source is disposed on the frame and is electrically connected to the first and second electrodes of each of the ophthalmic lenses, the voltage source being configured to control an orientation of the liquid crystals depending on the voltage applied between the first and second electrodes of each of the ophthalmic lenses, and the pair of eyeglasses further comprises two light projectors disposed on the frame, each of the light projectors being configured to project a light pattern on the second layer of one of the ophthalmic lenses, said second layer being locally conductive when illuminated by the light pattern, said light pattern corresponding to a pattern of refractive index modification to be induced by the liquid crystals of the first layer of the considered ophthalmic lens.

8. The optical device according to claim 7, wherein the pair of eyeglasses further comprise:

an eye-tracking device placed on the frame and configured to determine a viewing angle of a wearer of the eyeglasses, and two light deflectors, each light deflector being configured to deflect the light pattern produced by one of said light projectors on the surface of the second layer of one of the ophthalmic lenses at a location corresponding to the intersection of the determined viewing angle with the second layer of the considered ophthalmic lens.

9. A method for locally modifying the refractive index of an ophthalmic lens to provide an additional optical function to an ophthalmic lens, the method comprising the steps of:

providing an optical article comprising:

an ophthalmic lens comprising:

a substrate, a first layer comprising liquid crystals, said first layer being disposed on at least part of the substrate, a first electrode and a second electrode made of a conductive material and disposed on both sides of the first layer, a second layer made of photoconductive material placed between the first and second electrodes, and a voltage source electrically connected to the first and second electrodes, the voltage source being configured to control an orientation of the liquid crystals depending on the voltage applied between the first and second electrodes, a light projector configured to project a light pattern on the second layer of the ophthalmic lens, said second layer being locally conductive when illuminated by the light pattern, said light pattern corresponding to a pattern of refractive index modification to be induced by the liquid crystals of the first layer;

applying a voltage between the first and the second electrodes using said voltage source; and illuminating the ophthalmic lens with the light pattern provided by the light projector.

\* \* \* \* \*